F. I. TARLTON.
Coffee-Pots.
No. 133,681. 
Patented Dec. 3, 1872.
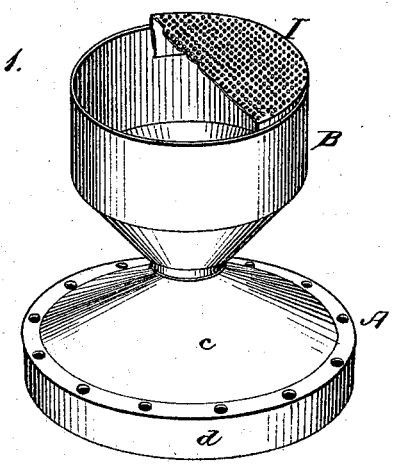
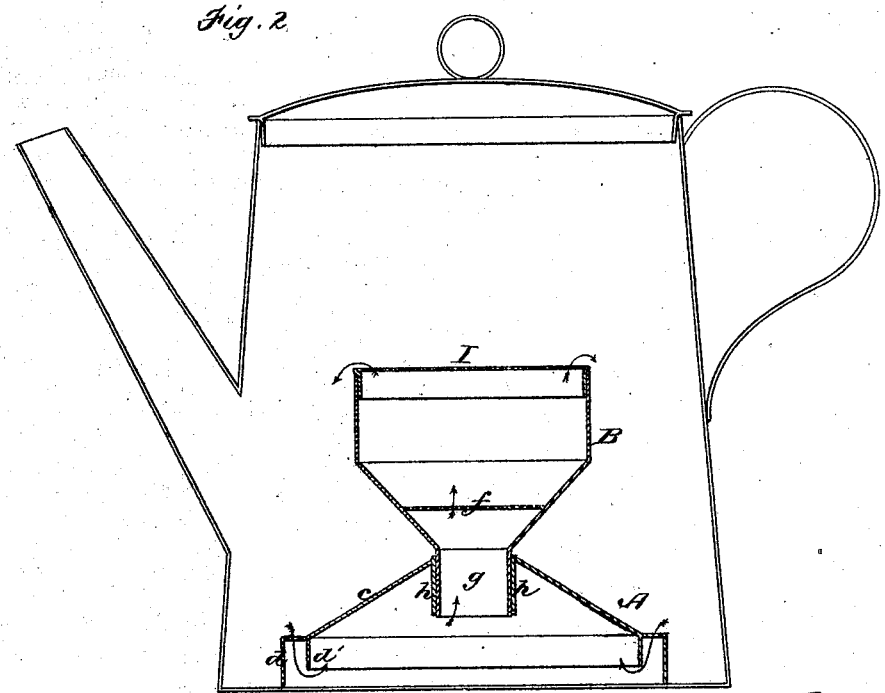
Witnesses.
C. F. Brown.
Melville Church.
Inventor.
F. I. Tarlton.
by his Attys
Hill & Ellsworth.

UNITED STATES PATENT OFFICE.

FRANCIS I. TARLTON, OF BALTIMORE, MARYLAND, ASSIGNOR OF ONE-HALF HIS RIGHT TO JOSHUA SINDALL, OF SAME PLACE.

IMPROVEMENT IN COFFEE-POTS.

Specification forming part of Letters Patent No. 133,681, dated December 3, 1872.

*To all whom it may concern:*

Be it known that I, FRANCIS I. TARLTON, of the city and county of Baltimore and State of Maryland, have invented a new and Improved Coffee-Boiler; and I do hereby declare the following to be a full and exact description of the same, reference being had to the accompanying drawing forming part of this specification, in which—

Figure 1 is a perspective view of my improved coffee-boiler; and Fig. 2 is a vertical section of a coffee-pot containing the boiler, also shown in vertical section.

Similar letters of reference in the accompanying drawing denote the same parts.

My invention has for its object to more thoroughly extract the essential elements of coffee for table use in a clear state and without waste; and to this end it consists in the peculiar construction of the receptacle or boiler, as I will now proceed to describe.

In the accompanying drawing, A is the base, and B the case or coffee-receptacle of the boiler. The base is formed of a slightly conical top, $c$, supported by a flange, $d$, and provided with a row of perforations inside the flange, as shown. A second flange, $d'$, of less depth than the first, is suspended from the under surface of the top $c$, so as to leave an annular channel between the two flanges communicating with the perforations in the top. The coffee-holder B is formed of an open funnel-shaped case, provided with a perforated bottom, $f$, and with its short central tube $g$ extending with close contact into the tubular flange $h$, which surrounds the central opening or apex of the base A and projects downward into the latter. By this connection the coffee-holder is adapted for ready removal from the base for cleaning and other purposes. The flange $h$ performs a twofold object—first, to hold the coffee-receptacle rigidly in an upright position; and, secondly, to direct the water in the coffee-pot upward through the receptacles instead of allowing it to escape from the base around the central hole. I is a perforated cap, by which the coffee-receptacle is closed when in use, as clearly shown in the drawing.

If desired, the base A and receptacle B may be secured permanently to each other, although I prefer to make them detachable to facilitate their cleaning.

The coffee-boiler thus constructed is placed within a coffee-pot, and either permanently attached to the bottom thereof or left unattached, as preferred, and its operation is as follows: The ground coffee is first placed within the receptacle B, which is then closed by the perforated cover or cap I, as shown. As the water boils within the pot it enters the base A through the perforations, passing under the flange $d$ and upward through the coffee in the receptacle with considerable force. It is also accompanied by the steam generated in the coffee-pot, and the action of both frees the coffee of its essential elements for table use, at the same time preventing the escape of the coffee-grounds to the top of the water or to the sides of the pot. The water and steam pass freely through the coffee and through the perforated bottom and cap of the receptacle, the circulation being kept up until the coffee is thoroughly treated.

Having thus described my invention, what I claim as new is—

The coffee-boiler, consisting of the perforated flanged base A, and the coffee-receptacle B having the central tube $g$, the perforated bottom $f$, and the removable perforated cap I, substantially as described, for the purpose specified.

FRANCIS I. TARLTON.

Witnesses:
PETER KREIS,
J. W. SINDALL.